(12) United States Patent
Otsuka et al.

(10) Patent No.: US 11,161,344 B2
(45) Date of Patent: Nov. 2, 2021

(54) METHOD FOR MANUFACTURING SUBSTRATE AND LIQUID EJECTION HEAD SUBSTRATE

(71) Applicant: CANON KABUSHIKI KAISHA, Tokyo (JP)

(72) Inventors: Manabu Otsuka, Kawasaki (JP); Tetsushi Ishikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 118 days.

(21) Appl. No.: 16/580,389

(22) Filed: Sep. 24, 2019

(65) Prior Publication Data

US 2020/0094522 A1 Mar. 26, 2020

(30) Foreign Application Priority Data

Sep. 26, 2018 (JP) .............................. JP2018-180591

(51) Int. Cl.
| | | |
|---|---|---|
| *B32B 43/00* | (2006.01) | |
| *B41J 2/16* | (2006.01) | |
| *B32B 7/06* | (2019.01) | |
| *B32B 27/06* | (2006.01) | |
| *B32B 7/05* | (2019.01) | |
| *B32B 37/00* | (2006.01) | |
| *B32B 38/10* | (2006.01) | |
| *B32B 38/00* | (2006.01) | |

(52) U.S. Cl.
CPC ............... *B41J 2/1623* (2013.01); *B32B 7/05* (2019.01); *B32B 7/06* (2013.01); *B32B 27/06* (2013.01); *B32B 37/025* (2013.01); *B32B 38/10* (2013.01); *B32B 38/164* (2013.01); *B32B 43/006* (2013.01); *Y10T 156/1111* (2015.01)

(58) Field of Classification Search
CPC ..... B32B 38/10; B32B 43/006; B32B 37/025; B32B 38/164; Y10T 156/1111
See application file for complete search history.

(56) References Cited

U.S. PATENT DOCUMENTS

| | | | | |
|---|---|---|---|---|
| 2007/0295458 | A1* | 12/2007 | Akechi ............. | H01L 21/67132 156/510 |
| 2011/0048611 | A1* | 3/2011 | Carre ................. | H01L 21/6836 156/73.1 |
| 2012/0000613 | A1* | 1/2012 | Thallner ............... | B32B 43/006 156/703 |
| 2013/0248099 | A1* | 9/2013 | Shimizu .............. | H01L 21/6835 156/247 |
| 2016/0311222 | A1* | 10/2016 | Sasaki .................... | B41J 2/1603 |

(Continued)

FOREIGN PATENT DOCUMENTS

JP 2006-137065 A 6/2006

*Primary Examiner* — Philip C Tucker
*Assistant Examiner* — Nickolas R Harm
(74) *Attorney, Agent, or Firm* — Canon U.S.A., Inc. IP Division

(57) ABSTRACT

A method for manufacturing a substrate having a resin layer, including, in this order: (1) providing the resin layer formed on a support, the support being larger than the outer size of the substrate; (2) bonding the resin layer supported on the support to the substrate; (3) removing an end portion of the resin layer disposed on the end portion of the support and in no contact with the substrate, by a solvent capable of dissolving the resin layer; and (4) peeling off the support from the resin layer.

9 Claims, 7 Drawing Sheets

(56) References Cited

U.S. PATENT DOCUMENTS

| | | | | |
|---|---|---|---|---|
| 2016/0332436 A1* | 11/2016 | Tang | ................ | H01L 21/67092 |
| 2018/0040489 A1* | 2/2018 | Fehkuhrer | ............ | H01L 21/6836 |
| 2019/0077156 A1* | 3/2019 | Yamamuro | ............ | B41J 2/1606 |
| 2019/0255852 A1* | 8/2019 | Nakano | ................ | B41J 2/1632 |

* cited by examiner

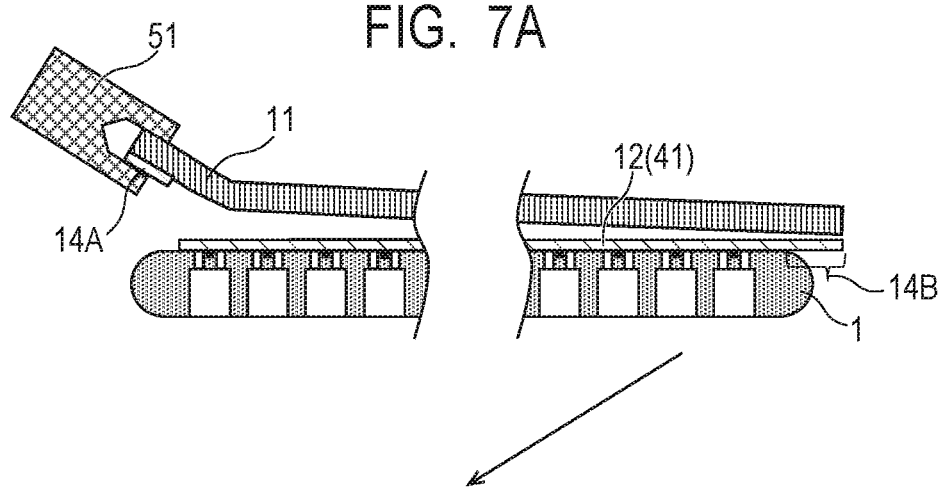
FIG. 7A
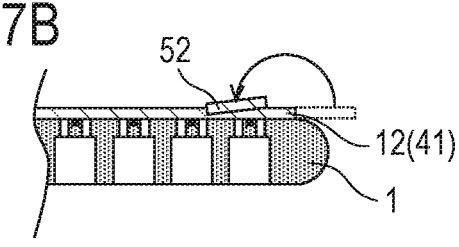
FIG. 7B
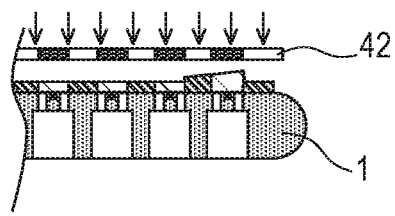
FIG. 7C
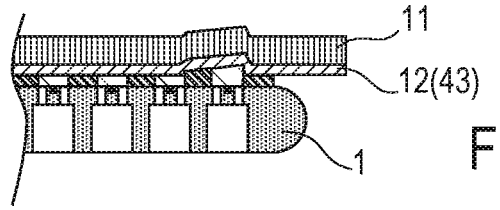
FIG. 7D
FIG. 7E
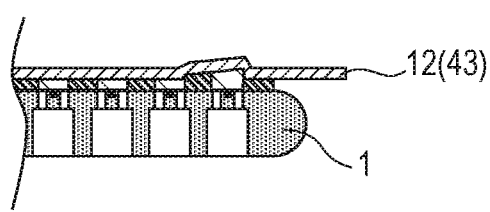
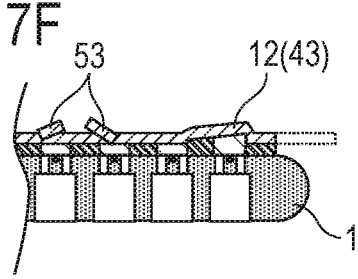
FIG. 7F
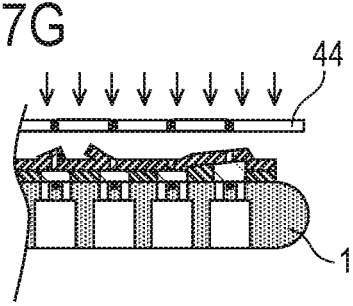
FIG. 7G
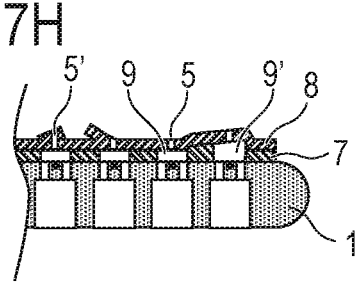
FIG. 7H

METHOD FOR MANUFACTURING SUBSTRATE AND LIQUID EJECTION HEAD SUBSTRATE

BACKGROUND

Field of the Disclosure

The present disclosure relates to a method for manufacturing a substrate and a liquid ejection head substrate.

Description of the Related Art

In the semiconductor industry, a technique to manufacture a device with high dimensional accuracy is required. For example, in an inkjet industry, uniformity of ejected ink drops is required for high definition of the image, so that a technique to uniformly form an ink flow path with high dimensional accuracy is required.

As one of the measures, in Japanese Patent Application Laid-Open No. 2006-137065, a method for forming a nozzle forming member on a substrate by bonding a resin layer including photosensitive resin to the substrate is described. In the method, the resin layer is supported by a support prior to bonding to the substrate, and the support is peeled off after bonding to the substrate. The nozzle forming member on the substrate is then formed into a flow path pattern by photolithography or the like.

Examples of the general factor for lowering the dimensional accuracy of an ink flow path include variations in film thickness derived from the method for forming a nozzle forming member. In the bonding method described in Japanese Patent Application Laid-Open No. 2006-137065, unlike conventional spin coating, slit coating and the like, no lowering of the uniformity of film thickness is caused by spinning stream or solvent drying, so that variation in the film thickness can be suppressed.

SUMMARY

One aspect of the present invention relates to a method for manufacturing a substrate having a resin layer, including the following steps in this order: (1) providing the resin layer formed on a support, the support being larger than the outer size of the substrate; (2) bonding the resin layer supported on the support to the substrate; (3) removing an end portion of the resin layer disposed on the end portion of the support and in no contact with the substrate, by a solvent capable of dissolving the resin layer; and (4) peeling off the support from the resin layer.

Also, another aspect of the present invention relates to a method for manufacturing a liquid ejection head substrate including a substrate, an energy generating element formed on a first surface of the substrate for ejecting a liquid, a liquid flow path for disposing the liquid on the energy generating element, an ejection orifice communicating with the liquid flow path for ejecting the liquid, a liquid supply port with an opening in the first surface of the substrate for supplying the liquid to the liquid flow path, and a common liquid chamber with an opening in a second surface opposite to the first surface of the substrate and communicating with the liquid supply port, wherein at least a part of members to form the ejection orifice or a wall of the liquid flow path includes the resin layer formed by the method for manufacturing a substrate described above.

Further features of the present invention will become apparent from the following description of exemplary embodiments with reference to the attached drawings.

BRIEF DESCRIPTION OF THE DRAWINGS

FIG. 7A is a schematic view illustrating a problem caused by a flash in a conventional manufacturing method.

FIG. 7B is a schematic view illustrating a problem caused by a flash in a conventional manufacturing method.

FIG. 7C is a schematic view illustrating a problem caused by a flash in a conventional manufacturing method.

FIG. 7D is a schematic view illustrating a problem caused by a flash in a conventional manufacturing method.

FIG. 7E is a schematic view illustrating a problem caused by a flash in a conventional manufacturing method.

FIG. 7F is a schematic view illustrating a problem caused by a flash in a conventional manufacturing method.

FIG. 7G is a schematic view illustrating a problem caused by a flash in a conventional manufacturing method.

FIG. 7H is a schematic view illustrating a problem caused by a flash in a conventional manufacturing method.

DESCRIPTION OF THE EMBODIMENTS

Preferred embodiments of the present invention will now be described in detail in accordance with the accompanying drawings.

It is preferable that the resin layer on a support is usually processed into the same shape as the substrate (wafer) to be bonded. However, from the viewpoints of easiness in bonding and tearing of the support, the support and the resin layer are processed into sizes larger than the shape (effective area) of the substrate. In that case, according to the examination of the present inventors, a flash of the resin layer is formed outside of the wafer area in tearing of the support, so that the flash missed in a step lowers the quality of a product in some cases.

Accordingly, an object of the present invention is to provide a method for manufacturing a substrate, capable of suppressing degradation of the quality of a product caused by missing of the flash in a manufacturing process for bonding a resin layer formed on a support to a substrate to form a structure. Also, another object of the present invention is to provide a method for manufacturing a liquid ejection head by using the manufacturing method of a substrate.

In the following, embodiments of the present invention are described with reference to drawings. Incidentally, in the present specification, a method for manufacturing a substrate according to the present invention is described with reference to a substrate for use in a liquid ejection head (liquid ejection head substrate), though the scope of the application of the present invention is not limited thereto. The liquid ejection head substrate can be suitably used in an inkjet recording apparatus which ejects ink, such as a printer, a copier, a facsimile machine, a word processor having a printer unit. Further, the liquid ejection head substrate can be applicable to a head installed on an industrial recording apparatus complexly arranged with various processing units for use in biochip preparation, electronic circuit printing, color filter production, and the like.

Figure 1A:
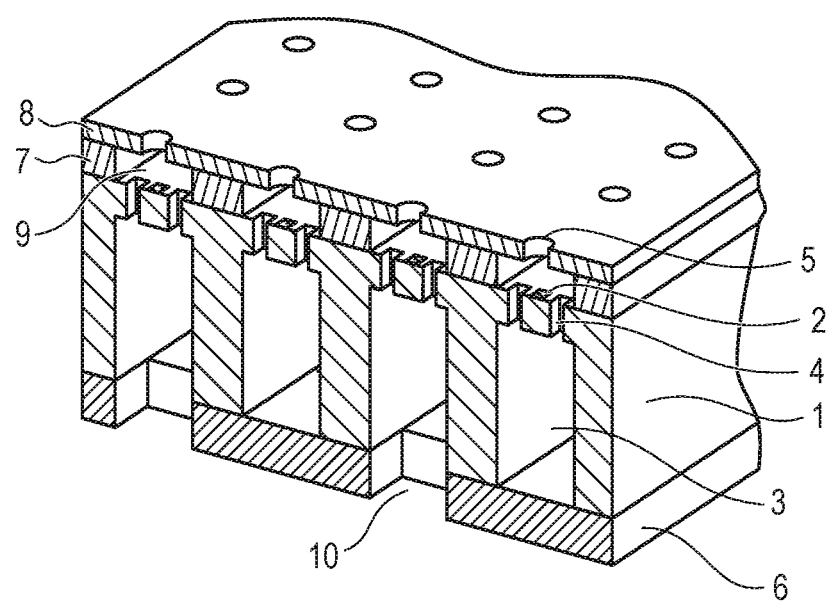
FIG. 1A is a schematic view illustrating a partially exploded liquid ejection head substrate.
Figure 1B:
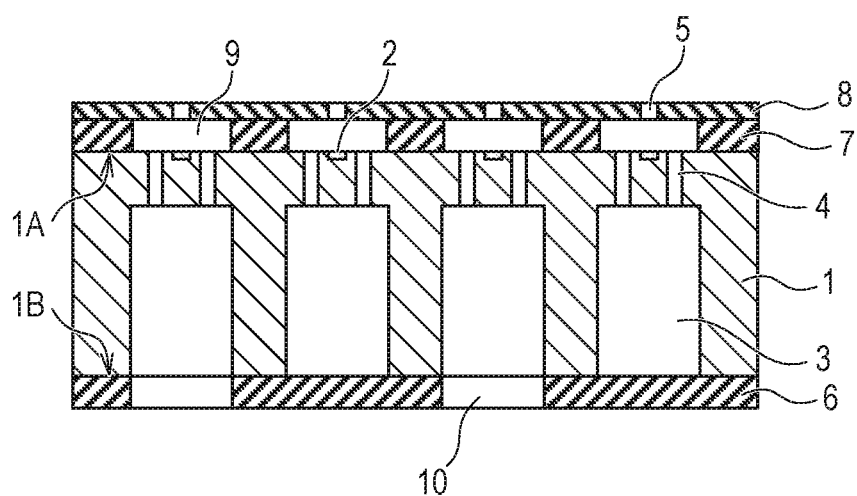
FIG. 1B is a schematic cross-sectional view illustrating a partially exploded liquid ejection head substrate.

FIG. 1A is a schematic perspective view illustrating a partially exploded liquid ejection head substrate obtained by the method for manufacturing according to an embodiment of the present invention, and FIG. 1B is a cross-sectional view. In FIG. 1A and FIG. 1B, on a first surface 1A of the substrate 1, an energy generating element 2 and a wiring (not shown in drawing) connected to the energy generating element 2 are formed, wherein the energy generating element 2 generates energy used for ejecting a liquid such as an ink. Also, on the first surface 1A of the substrate 1, a liquid flow path 9 for disposing a liquid on the energy generating element 2 and a plurality of ejection orifices 5 communicating with the liquid flow path 9 for ejecting the liquid are provided. A flow path forming member 7 which forms the wall of the liquid flow path 9 and an ejection orifice forming member 8 which forms the ejection orifice 5 are provided. A combination of the flow path forming member 7 and the ejection orifice forming member 8 may be referred to as a nozzle forming member. A common liquid chamber 3 passing through the substrate 1 to have an opening in a second surface 1B opposing to the first surface 1A, and a liquid supply port 4 communicating with the liquid flow path 9 and the common liquid chamber 3 to have an opening in the first surface 1A are provided. Further, on the second surface 1B of the substrate 1, a cover structure 6 having an opening portion 10 for introducing a liquid into the common liquid chamber 3 is provided.

In a liquid ejection head substrate having the structure described above, a liquid is supplied from the opening portion 10 to the liquid flow path 9 through the common liquid chamber 3 and the liquid supply port 4, and ejected from the ejection orifice 5 by energy generated from the energy generating element 2 corresponding to recording signals. For example, in the case where the energy generating element 2 is an electricity-to-heat converter, a liquid drop is ejected from the ejection orifice 5 by using the pressure change caused by instantaneous bubble growth in the liquid, so that recording is performed on a recording medium.

The method for manufacturing a substrate according to the present invention includes at least the following steps in this order:

(1) providing the resin layer formed on a support, the support being larger than the outer size of the substrate;

(2) bonding the resin layer supported on the support to the substrate;

(3) removing an end portion of the resin layer disposed on the end portion of the support and in no contact with the substrate, by a solvent capable of dissolving the resin layer; and (4) peeling off the support from the resin layer.

In the following, a method for manufacturing a liquid ejection head substrate including the method for manufacturing a substrate according to an embodiment of the present invention is described with reference to FIG. 2A to FIG. 2M, though the present invention is not limited thereto. FIG. 2A to FIG. 2M illustrate a flow of the steps in the method for manufacturing a liquid ejection head substrate in the present embodiment, being schematic cross-sectional views illustrating one end portion of a substrate (wafer) in the respective steps. The whole outer circumference of the wafer is subjected to the same steps. The structure functioning as a liquid ejection head substrate is the same as that of the liquid ejection head substrate in FIG. 1A and FIG. 1B.

Figure 2A:
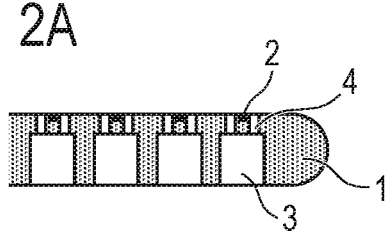
FIG. 2A is a schematic cross-sectional view illustrating a step of the process for manufacturing a liquid ejection head substrate.

First, as illustrated in FIG. 2A, a substrate 1 having an energy generating element 2, a common liquid chamber 3 and a liquid supply port 4 is provided. Incidentally, on the surface of the substrate 1, a surface membrane layer (not shown in drawing) including a wiring and an interlayer insulating film is formed in addition to the energy generating element 2. The common liquid chamber 3 and the liquid supply port 4 can be formed by etching through an etching mask formed by using a photoresist or the like. Incidentally, a step of forming the common liquid chamber 3 and the liquid supply port 4 may be performed after formation of an ejection orifice described below.

Figure 2B:
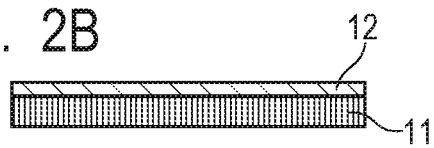
FIG. 2B is a schematic cross-sectional view illustrating a step of the process for manufacturing a liquid ejection head substrate.

Subsequently, as illustrated in FIG. 2B, a member having a resin layer 12 formed on a support 11 is provided. As the support 11, a generally used film material such as polyethylene terephthalate, polyimide and polyamide, a film having a release film formed on the surface of the film material, and a release-treated film may be used. The support 11 has a thickness of preferably 10 μm to 200 μm, and from the viewpoint of inhibiting depression of the resin layer 12 on the liquid supply port 4, more preferably 75 μm to 200 μm. Examples of the resin for use in the resin layer 12 include a photosensitive resin, a photocurable resin and a thermosetting resin. Examples of the method for forming the resin layer 12 include spin coating and slit coating. The thickness of the resin layer 12 is preferably 0.5 μm to 100 μm. The support 11 is processed to have an outer shape larger than the outer shape of the substrate 1 (wafer).

Figure 2C:
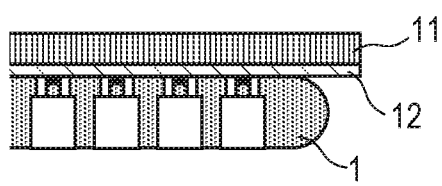
FIG. 2C is a schematic cross-sectional view illustrating a step of the process for manufacturing a liquid ejection head substrate.

Subsequently, as illustrated in FIG. 2C, the resin layer 12 formed on the support 11 is bonded to the substrate 1 having a common liquid chamber and a liquid supply port. Incidentally, in the case where a common liquid chamber and a liquid supply port are formed after formation of an ejection orifice, the common liquid chamber and the liquid supply port are not yet formed on the substrate 1 at this time. In bonding, it is preferable that the outer circumference of the support 11 do not run into the inside of the outer circumference of the substrate 1 (wafer), or, in other words, that the resin layer 12 protrude along the whole outer circumference of the wafer. It is more preferable that the resin layer 12 protrudes along the whole outer circumference of the wafer in an approximately uniform state.

Figure 2D:
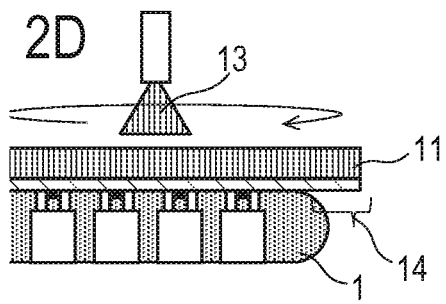
FIG. 2D is a schematic cross-sectional view illustrating a step of the process for manufacturing a liquid ejection head substrate.
Figure 2E:
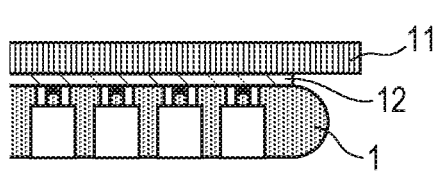
FIG. 2E is a schematic cross-sectional view illustrating a step of the process for manufacturing a liquid ejection head substrate.

To the substrate having a resin layer thus formed, a solvent 13 capable of dissolving the resin layer in a state having the support 11 is introduced as illustrated in FIG. 2D, so that the end portion of a resin layer 14 in no contact with the substrate on the end portion of the support is removed as illustrated in FIG. 2E. Although the solvent may be any capable of dissolving the resin layer, a solvent capable of selectively dissolving the resin layer without affecting the pattern or the like provided on the support or the substrate is preferred. For example, in the case where the resin of the resin layer is made of epoxy resin, PGMEA (propylene glycol 1-monomethyl ether 2-acetate) may be used as the solvent. Examples of the method for introducing the solvent include spraying solvent directly to the resin layer from the side, introducing the solvent from above the support to sneak to the resin layer through surface tension, and introducing the solvent from the substrate side having the resin layer.

In FIG. 2D, a method for introducing the solvent from above the support is illustrated. According to the method, by rotating the substrate with a controlled rotation speed, the resin layer dissolved in the solvent can be efficiently discharged by centrifugal force, and the sneaking amount of solvent can be favorably controlled. On this occasion, the effective area of the substrate may be protected from contact with the solvent by a protective tape disposed on the second surface of the substrate.

Figure 3:
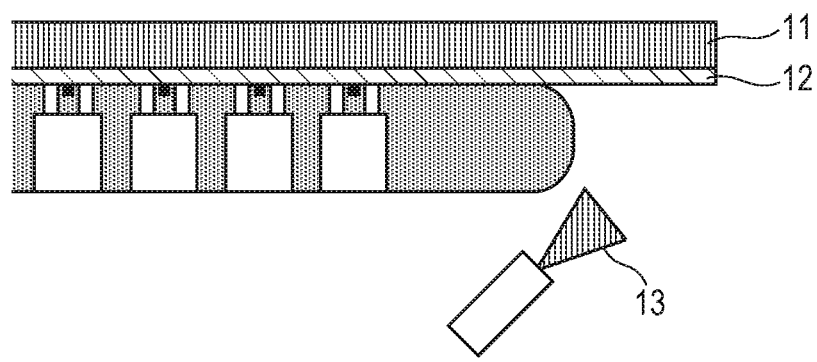
FIG. 3 is a schematic view illustrating a step of removing an end portion of the resin layer in no contact with a substrate as an example.

In the method for introducing a solvent from above the support, in the case where the end portion of the support is positioned within 5 mm outside of the end portion of the support, the rotation speed of the substrate is preferably 500 to 2000 rpm. With a rotation speed of the substrate of 500 rpm or more, the controllability of the solvent sneaking to the resin layer can be enhanced. As a result, the dissolved resin layer can be inhibited from sneaking to the rear surface of the substrate and affecting the substrate. Also, with a rotation speed of the substrate of 2000 rpm or less, the solvent can easily sneak to the resin layer. Even in the case where the end portion of the support is positioned beyond 5 mm outside of the end portion of the substrate, the resin layer in no contact with the substrate can be removed by reducing the rotation speed of the substrate. However, the controllability of the sneaking of solvent may be lowered, or the dissolved resin layer may sneak to the rear surface of the substrate to affect the substrate, in some cases. In that case, a method for introducing the solvent 13 from the substrate 1 side as illustrated in FIG. 3 is therefore preferred. In that case also, it is preferable that the rotation speed of the substrate be controlled at 500 to 2000 rpm not to affect the substrate.

Figure 4A:
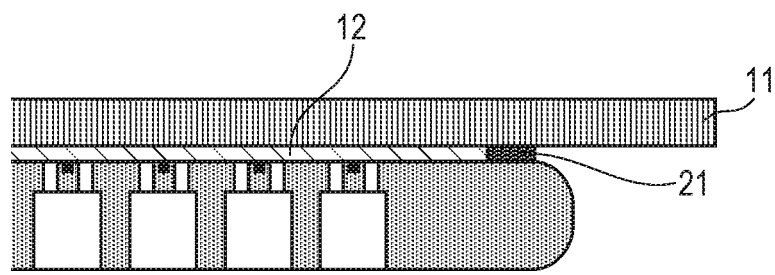
FIG. 4A is a schematic view illustrating stringiness of the resin layer.
Figure 4B:
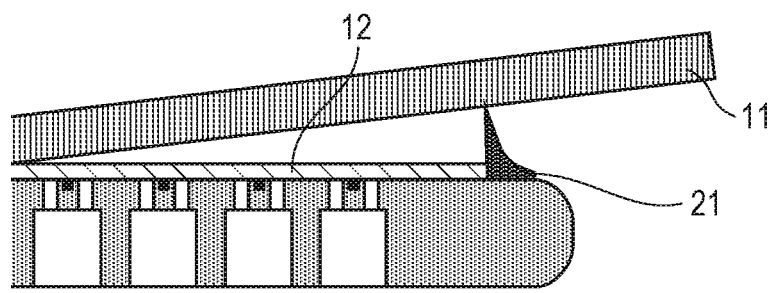
FIG. 4B is a schematic view illustrating stringiness of the resin layer.

By the way, when an end portion of the resin layer 14 is removed, the resin layer sandwiched between the support 11 and the substrate 1 may be infiltrated with the solvent to form a resin layer 21 having a reduced viscosity (deformable layer) in some cases as illustrated in FIG. 4A. And as illustrated in FIG. 4B, when the support 11 is peeled off, the stringy resin layer 21 may be caught on the effective area of the substrate to lower the quality of a product. In such a case, a step of drying may be added as countermeasure. In other words, it is preferable that the method for manufacturing a substrate according to the present invention have a step of drying between the steps of removing an end portion of the resin layer in no contact with the substrate by using a solvent and peeling off the support from the resin layer.

In the case where the saturated vapor pressure of the solvent at normal temperature (20° C.) is sufficiently high, the step of drying may be performed by natural drying in which the solvent is left standing at normal temperature for at least 30 minutes or more. However, it is preferable that the evaporation of the solvent be accelerated by using vacuum drying, heat drying, or both thereof. The vacuum drying becomes more effective as the degree of vacuum increases. In order to accelerate the evaporation rate, it is preferable that the drying be performed at least under a reduced-pressure environment with a degree of vacuum of 100 Pa or less.

Figure 5:
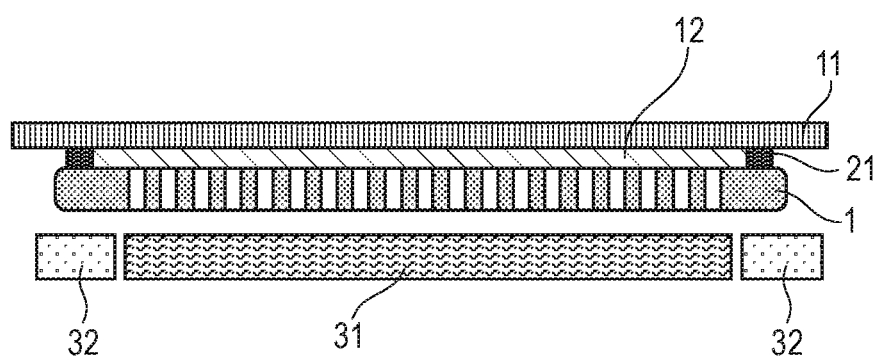
FIG. 5 is a schematic view illustrating a heating method as an example in a drying step.

In the step of drying, it is preferable that at least the outer circumference of a substrate be heated. In the case where the substrate has a recess such as a liquid supply port 4 as shown in FIG. 2A to FIG. 2M, the substrate and the resin layer are bonded such that the resin layer covers the recess. As a result, when a substrate having a recess is subjected to heat drying, the resin layer may be softened and thereby the resin layer may be depressed at the recess, resulting in difficulty in maintaining the desired shape in some cases. It is therefore preferable that the heating temperature in the step of drying be less than the softening point of the resin of the resin layer. In the case where heating at a temperature exceeding the softening point of the resin of the resin layer is required, only the end portion of the substrate may be selectively heated by using a method for heating the resin layer 21 with a heating plate 32 while cooling the recess area of the substrate 1 with a cooling plate 31, for example, as illustrated in FIG. 5.

Figure 2F:
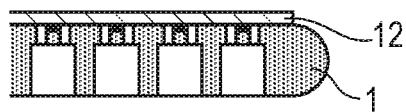
FIG. 2F is a schematic cross-sectional view illustrating a step of the process for manufacturing a liquid ejection head substrate.

Subsequently, as illustrated in FIG. 2F, the support 11 is peeled off from the resin layer 12. In the present invention, since the resin layer 14 in no contact with the substrate is removed by a solvent in the step described above, occurrence of a flash derived from the resin layer 14 in no contact with the substrate can be inhibited when the support 11 is peeled off from the resin layer 12. Subsequently, by using the resin layer 12 formed on the substrate 1, a flow path forming member and an ejection orifice forming member are formed by the following method.

Figure 2G:
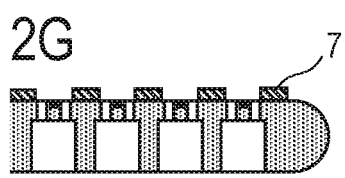
FIG. 2G is a schematic cross-sectional view illustrating a step of the process for manufacturing a liquid ejection head substrate.

First, as illustrated in FIG. 2G, the resin layer 12 formed on the substrate 1 is processed into a desired shape, so that a flow path forming member 7 is formed. In the case where the resin layer 12 is a photosensitive resin, the flow path forming member 7 is formed by subjecting the resin layer 12 to exposure through a photomask and development treatment. In the case where the resin layer 12 is a thermosetting resin or a photocurable resin, a resist mask or the like is formed on the resin layer by using a photosensitive resin to be etched for processing into a desired shape.

Figure 2H:
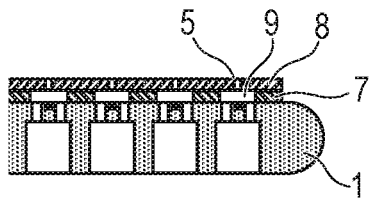
FIG. 2H is a schematic cross-sectional view illustrating a step of the process for manufacturing a liquid ejection head substrate.

Subsequently, as illustrated in FIG. 2H, an ejection orifice forming member 8 having an ejection orifice 5 is formed. First, on the substrate 1 having a flow path forming member 7, a resin layer (not shown in drawing) to make an ejection orifice forming member 8 is applied to a support (not shown in drawing) in the same manner as in formation of the resin layer 12 described above, and after bonding to the substrate, the resin layer in no contact with the substrate is removed with a solvent. After the support is peeled off from the resin layer, an ejection orifice 5 is formed in the ejection orifice forming member 8 by using a method such as photolithography and etching. As the resin to form the resin layer, the support and the solvent in the present step, the same ones as described in formation of the flow path forming member may be used.

In the case where both of the resin layers to form the flow path forming member 7 and the ejection orifice forming member 8 include a photosensitive resin, the unexposed portion of the resin layers to make the ejection orifice 5 and liquid flow path 9 may be developed together after formation of the ejection orifice forming member 8, without development when the flow path forming member 7 is formed. In that case, a second photosensitive resin to form the ejection orifice forming member 8 is made to have higher sensitivity than that of a first photosensitive resin to form the flow path forming member 7, such that the unexposed portion of the resin layer to make the flow path forming member 7 is not photosensitized when the resin layer to make the ejection orifice forming member 8 is exposed. Specifically, a photoinitiator (acid generator or the like) compounded in the second photosensitive resin is made to have higher sensitivity than that of the one compounded in the first photosensitive resin. In the case where the resin layer is formed of thermosetting resin or photocurable resin, etching is performed using a resist mask or the like, such that the resin layer is processed into a desired shape. As described above, after the step, a common liquid chamber 3 and a liquid supply port 4 may be formed.

Figure 2I:
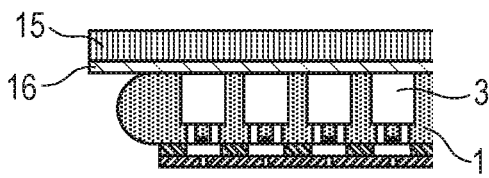
FIG. 2I is a schematic cross-sectional view illustrating a step of the process for manufacturing a liquid ejection head substrate.
Figure 2J:
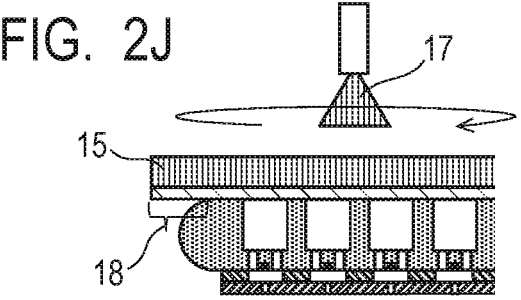
FIG. 2J is a schematic cross-sectional view illustrating a step of the process for manufacturing a liquid ejection head substrate.
Figure 2K:
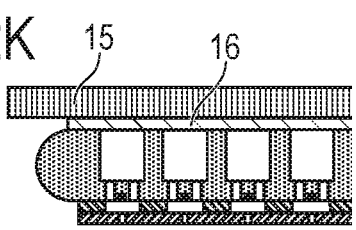
FIG. 2K is a schematic cross-sectional view illustrating a step of the process for manufacturing a liquid ejection head substrate.
Figure 2L:
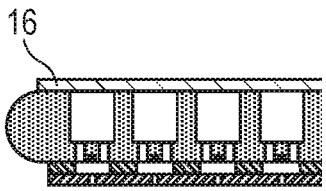
FIG. 2L is a schematic cross-sectional view illustrating a step of the process for manufacturing a liquid ejection head substrate.
Figure 2M:
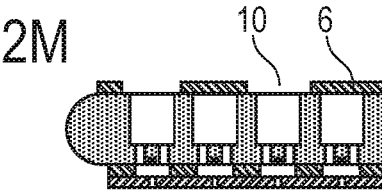
FIG. 2M is a schematic cross-sectional view illustrating a step of the process for manufacturing a liquid ejection head substrate.

Subsequently, a cover structure 6 is formed on the common liquid chamber 3 having an opening in the second surface of the substrate 1. First, in the same manner as in formation of the flow path forming member, a member having a resin layer 16 to make a cover structure 6 formed on a support 15 is provided. Subsequently, as illustrated in FIG. 2I, the resin layer 16 is bonded to the second surface of the substrate 1 having the common liquid chamber 3. Subsequently, in the same manner as in the case of flow path forming member, a resin layer 18 in no contact with the substrate is removed by using a solvent 17 capable of dissolving the resin layer as illustrated in FIG. 2J. Subsequently, as illustrated in FIG. 2K, a step of drying is performed on as needed basis, in a state where the resin layer in no contact with the substrate is removed, and as illustrated in FIG. 2L, the support 15 is peeled off from the resin layer 16. As illustrated in FIG. 2M, the resin layer 16 is then processed into a desired shape by etching or photolithography, so that the cover structure 6 having an opening portion 10 is formed. Incidentally, as the resin to form the resin layer, the support and the solvent in the present step, the same ones as described in formation of the flow path forming member may be used. Also, the step of drying is performed in the same manner as described in formation of the flow path forming member. In order to protect the nozzle forming member formed on the first surface of the substrate, it is preferable that a protective member be provided.

Through the steps described above, the liquid ejection head substrate according to the present invention is manufactured. According to the manufacturing method of the present invention, missing of a flash derived from the resin layer in no contact with the substrate in a manufacturing process can be inhibited, so that the degradation of the quality of a product can be more suppressed in comparison with conventional art.

EXAMPLES

An example is described in which a liquid ejection head substrate is prepared as the substrate manufactured by using the present invention. Although a liquid ejection head substrate is described as an example, the use of the substrate manufactured by the present invention is not limited thereto.

Example 1

As illustrated in FIG. 2A, a substrate 1 made of silicon having a surface membrane layer including an energy generating element 2 was provided. On the substrate 1, a common liquid chamber 3 and a liquid supply port 4 were then formed by a Bosch process as RIE (reactive ion etching) method.

Subsequently, as illustrated in FIG. 2B, on a polyethylene terephthalate (PET) film having a thickness of 100 μm as support 11, an epoxy resin (trade name: N-695, manufactured by DIC Corporation, softening point: 60° C.) to make a first photosensitive resin layer as resin layer 12 was applied. Specifically, a solution of the epoxy resin and a photoinitiator (trade name: CPI-210S, manufactured by San-Apro Ltd.) having sensitivity at an exposure wavelength of 365 nm dissolved in a solvent (PGMEA) was applied to the support 11 by slit coating. The amount of the photoinitiator added was determined through adjustment of sensitivity, such that a second photosensitive resin layer to make an ejection orifice forming member was able to be selectively patterned by exposure. Incidentally, the thickness of the first photosensitive resin layer was controlled to 16 μm.

Subsequently, as illustrated in FIG. 2C, the resin layer (first photosensitive resin layer) and the substrate 1 having a common liquid chamber and a liquid supply port formed in advance were bonded by a roll laminator. In the present embodiment, a condition of a temperature of 90° C. and a pressure of 0.4 MPa was applied, such that the thickness of the first photosensitive resin layer on the substrate 1 was controlled to 15 μm. On this occasion, cutting was performed such that the end portion of the support 11 was positioned at 0.5 mm outside from the end portion of the substrate 1.

Figure 6A:
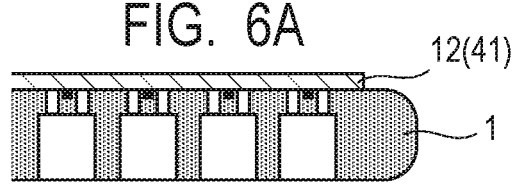
FIG. 6A is a cross-sectional view illustrating a part of the process for manufacturing a liquid ejection head substrate.

Subsequently, as illustrated in FIG. 2D, a resin layer 14 in no contact with the substrate on the end portion of the support was removed by a single wafer wet processing apparatus with use of a solvent 13 capable of dissolving the resin layer (FIG. 2E). As the solvent 13, PGMEA was used. The rotation speed of the substrate was set to 2000 rpm, and the processing time was set to 5 seconds. Subsequently, the substrate with the resin layer in no contact with the substrate removed was heated at 40° C. for 30 minutes for drying under a reduced-pressure environment of 100 Pa or less. Subsequently, as illustrated in FIG. 6A, the support was peeled off from the resin layer 12 (first photosensitive resin layer 41) at normal temperature.

Figure 6B:
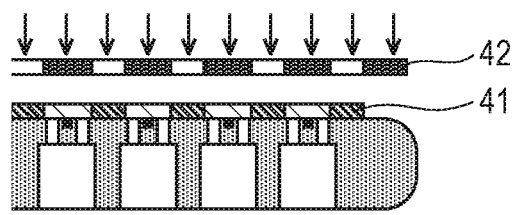
FIG. 6B is a cross-sectional view illustrating a part of the process for manufacturing a liquid ejection head substrate.

Subsequently, as illustrated in FIG. 6B, the first photosensitive resin layer 41 was exposed to light having an exposure wavelength of 365 nm at an exposure amount of 5000 J/m$^2$ through a photo mask 42 by using an exposure machine. PEB (Post Exposure Bake) was then performed at 50° C. for 5 minutes to form a latent image, such that an exposed portion of the first photosensitive resin layer 41 made the flow path forming member 7 and an unexposed portion made the liquid flow path.

Figure 6C:
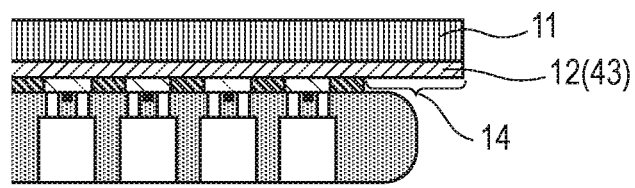
FIG. 6C is a cross-sectional view illustrating a part of the process for manufacturing a liquid ejection head substrate.

Subsequently, in the same manner as illustrated in FIG. 2B, a member having a resin layer 12 (second photosensitive resin layer) on a PET film having a thickness of 100 µm as support 11 was provided. Specifically, a solution of the epoxy resin (trade name: 157S70, manufactured by Japan Epoxy Resin Co., Ltd., softening point: 50° C.) and a photoinitiator (trade name: LW-S1, manufactured by San-Apro Ltd.) having sensitivity at an exposure wavelength of 365 nm dissolved in PGMEA was applied to the support 11 by slit coating. Subsequently, as illustrated in FIG. 6C, the second photosensitive resin layer 43 and the first photosensitive resin layer 41 were brought into contact to be bonded by a roll laminator. In the present embodiment, a condition of a temperature of 55° C. and a pressure of 0.2 MPa was applied, such that the thickness of the second photosensitive resin layer 43 on the substrate 1 was controlled to 15 µm. On this occasion, cutting was performed such that the end portion of the support 11 was positioned at 0.5 mm outside from the end portion of the substrate 1.

In order to prevent the unexposed portion of the liquid flow path pattern formed on the first photosensitive resin layer 41 being photosensitized, it is preferable that the first photosensitive resin layer 41 and the second photosensitive resin layer 43 have difference in sensitivity. Specifically, the photosensitivity of the first photosensitive resin layer 41 is controlled to be lower than that of the second photosensitive resin layer 43. It was found that as long as the second photosensitive resin layer 43 has a sensitivity of 3 or more when the sensitivity of the first photosensitive resin layer 41 is taken as 1, the first photosensitive resin layer 41 is not affected.

Figure 6D:
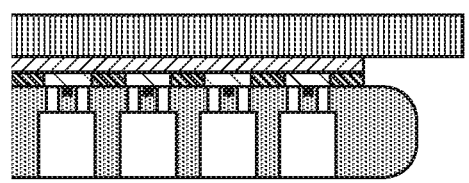
FIG. 6D is a cross-sectional view illustrating a part of the process for manufacturing a liquid ejection head substrate.

Subsequently, in the same manner as illustrated in FIG. 2D, a resin layer 14 in no contact with the substrate on the end portion of the support was removed by a single wafer wet processing apparatus with use of a solvent 13 capable of dissolving the resin layer (FIG. 6D). As the solvent 13, PGMEA was used. The rotation speed of the substrate was set to 2000 rpm, and the processing time was set to 5 seconds. Subsequently, the substrate with the resin layer in no contact with the substrate removed was heated at 40° C. for 30 minutes for drying under a reduced-pressure environment of 100 Pa or less. Subsequently, the support 11 was peeled off from the second photosensitive resin layer 43 at normal temperature.

Figure 6E:
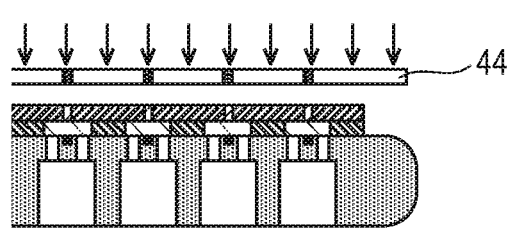
FIG. 6E is a cross-sectional view illustrating a part of the process for manufacturing a liquid ejection head substrate.

Subsequently, as illustrated in FIG. 6E, the second photosensitive resin layer 43 was exposed to light having an exposure wavelength of 365 nm at an exposure amount of 1000 J/m$^2$ through a photo mask 44 by using an exposure machine. PEB was then performed at 90° C. for 4 minutes to form a latent image, such that an exposed portion of the second photosensitive resin layer 43 made the ejection orifice forming member 8 and an unexposed portion made the ejection orifice 5.

Figure 6F:
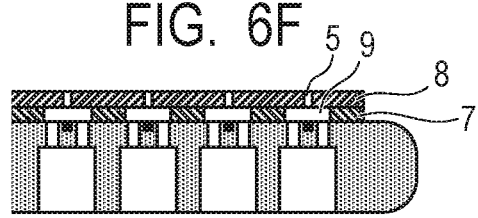
FIG. 6F is a cross-sectional view illustrating a part of the process for manufacturing a liquid ejection head substrate.

Subsequently, the unexposed portion was dissolved in PGMEA by a development apparatus, so that the unexposed portion of the first photosensitive resin layer 41 and the unexposed portion of the second photosensitive resin layer 43 were developed as illustrated in FIG. 6F. Further, a curing step was performed at 200° C. for 1 hour, so that a flow path forming member 7 having a liquid flow path 9, and an ejection orifice forming member 8 having an ejection orifice 5 were formed.

Subsequently, after a protective member (not shown in drawing) was adhered to the surface having the ejection orifice, a member having a photoresist to make a resin layer 16 (third photosensitive resin layer) laminated on a PET film as support 15 was provided. As photoresist, an epoxy resin-based negative-type photoresist "TMMC" (trade name, manufactured by Tokyo Ohka Kogyo Co., Ltd., softening point: 45° C.) was used. As illustrated in FIG. 2I, the member was bonded to the second surface of the substrate having the common liquid chamber 3 on the resin layer side by a roll laminator. The bonding was performed under a condition of a stage temperature of 40° C., a roller temperature of 40° C. and a roller pressure of 0.2 MPa, such that the thickness of the third photosensitive resin layer was controlled to 20 µm. On this occasion, cutting was performed such that the end portion of the support 15 was positioned at 0.5 mm outside from the end portion of the substrate.

Subsequently, as illustrated in FIG. 2J, a resin layer 18 in no contact with the substrate on the end portion of the support was removed by a single wafer wet processing apparatus with use of a solvent 17 capable of dissolving the resin layer (FIG. 2K). As the solvent 17, PGMEA was used. The rotation speed of the substrate was set to 2000 rpm, and the processing time was set to 5 seconds. Subsequently, the substrate with the resin layer in no contact with the substrate removed was heated at 40° C. for 30 minutes for drying under a reduced-pressure environment of 100 Pa or less. Subsequently, as illustrated in FIG. 2L, the support 15 was peeled off from the resin layer 16 (third photosensitive resin layer) at normal temperature.

Subsequently, the third photosensitive resin layer 41 was exposed to light having an exposure wavelength of 365 nm at an exposure amount of 400 mJ/m$^2$ through a photo mask by using an exposure machine. Subsequently, as illustrated in FIG. 2M, after the protective member was peeled off to perform PEB at 90° C. for 10 minutes, development was performed by dissolving an unexposed portion in PGMEA by a development apparatus. A curing step was then performed at 200° C. for 1 hour, so that a cover structure 6 having an opening portion 10 was formed. The electrical bonding of an electrical wiring member (not shown in drawing) was performed for driving energy generating element (electricity-to-heat converter) to the liquid ejection head substrate thus formed. Thereby, the liquid ejection head substrate according to the present invention was obtained.

Comparative Example 1

Except that a step of removing the resin layer in no contact with the substrate on the end portion of the support was not performed, a liquid ejection head substrate according to Comparative Example 1 was made in the same manner as in Example 1. The specific manufacturing method is described as follows.

In the same manner as in Example 1, a resin layer 12 (first photosensitive resin layer 41) was bonded to a substrate 1, such that the end portion of a support 11 was positioned at 0.5 mm outside from the end portion of the substrate 1.

Subsequently, without removal of a resin layer 14 in no contact with the substrate on the end portion of the support 11, one end portion of the support 11 was held by a jig 51 so as to be peeled off from the resin layer 12 (first photosensitive resin layer 41) as illustrated in FIG. 7A. On this occasion, a resin layer 14A held by the jig 51 was removed together with the support 11, while a portion of a resin layer 14B in no contact with the substrate, not held by the jig 51, remained as a flash. The flash was missed due to contact with a substrate carrier or in a manufacturing process and adhered to the surface of the resin layer 12 as a missing flash 52 as illustrated in FIG. 7B.

Subsequently, as illustrated in FIG. 7C, the first photosensitive resin layer 41 was exposed to light having an exposure wavelength of 365 nm at an exposure amount of 5000 J/m$^2$ through a photo mask 42 by using an exposure machine. On this occasion, a part of the missing flash 52 was also exposed in the same manner. PEB was then performed at 50° C. for 5 minutes to form a latent image, such that an unexposed portion of the first photosensitive resin layer 41 made the liquid flow path. However, the missing flash 52 was also exposed to be cured.

Subsequently, a member having an epoxy resin to make a second photosensitive resin layer 43 (resin layer 12) laminated on a PET film having a thickness of 100 μm as support 11 was provided in the same manner as in Example 1. As illustrated in FIG. 7D, the second photosensitive resin layer 43 and the first photosensitive resin layer 41 were brought into contact to be bonded by a roll laminator. In the present Comparative Example, a condition of a temperature of 55° C. and a pressure of 0.2 MPa was applied, such that the thickness of the second photosensitive resin layer 43 on the substrate 1 was controlled to 15 μm. On this occasion, cutting was performed such that the end portion of the support 11 was positioned at 0.5 mm outside from the end portion of the substrate 1. Incidentally, the flatness of the second photosensitive resin layer 43 was partially impaired due to influence of the cured portion of the flash 52.

Subsequently, in the same manner as in the case of the first photosensitive resin layer 41, without removal of the resin layer 14 in no contact with the substrate on the end portion of the support, the support 11 was peeled off from the second photosensitive resin layer 43 as illustrated in FIG. 7E. On this occasion, the resin layer 14 in no contact with the substrate remained as a flash. The flash was missed due to contact with a substrate carrier or in a manufacturing process and adhered to the surface of the substrate as a missing flash 53 as illustrated in FIG. 7F.

Subsequently, as illustrated in FIG. 7G in the same manner as in Example 1, the second photosensitive resin layer 43 was exposed to light having an exposure wavelength of 365 nm at an exposure amount of 1000 mJ/m$^2$ through a photo mask 44 by using an exposure machine, and then subjected to PEB at 90° C. for 4 minutes. On this occasion, the missing flash 53 was also exposed to be cured.

Subsequently, the unexposed portion was dissolved in PGMEA by a development apparatus, so that the unexposed portion of the first photosensitive resin layer 41 and the unexposed portion of the second photosensitive resin layer 43 were removed as illustrated in FIG. 7H. A curing step was then performed at 200° C. for 1 hour, so that a flow path forming member 7 having a liquid flow path 9 and an ejection orifice forming member 8 having an ejection orifice 5 were formed. On this occasion, defect parts caused by flashes 52 and 53 missed in the manufacturing process were formed on the ejection orifice forming member 8, and between the flow path forming member 7 and the ejection orifice forming member 8, so that the change in the capacity of the liquid chamber such as in a liquid flow path 9' and abnormal length of the ejection orifice such as in an ejection orifice 5' were found. Degradation of the ejection performance caused by the abnormalities was confirmed.

Further, in the case where no step of removing the resin layer in no contact with the substrate on the end portion of the support was performed in formation of the cover structure 6 in the same manner as in Example 1, deposition of the flash derived from the resin layer in no contact with the surface of the cover structure 6 was found. As a result, the flatness of the cover structure 6 was impaired, so that leakage of the ejection liquid occurred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-180591, filed Sep. 26, 2018, which is hereby incorporated by reference herein in its entirety.

What is claimed is:

1. A method for manufacturing a substrate having a resin layer, comprising:
   (1) providing the resin layer formed on a support, the support being larger than an outer size of the substrate;
   (2) bonding the resin layer formed on the support to the substrate;
   (3) removing an end portion of the resin layer disposed on an end portion of the support and in no contact with the substrate by a solvent capable of dissolving the resin layer;
   (4) peeling off the support from the resin layer; and
   (5) drying the resin layer infiltrated with the solvent between (3) and (4).

2. The method for manufacturing a substrate according to claim 1, wherein at least an outer circumference of the substrate is heated during drying.

3. The method for manufacturing a substrate according to claim 1, wherein drying the resin layer is performed at least under a a degree of vacuum of 100 Pa.

4. The method for manufacturing a substrate according to claim 1, wherein the substrate has a recess, and in (2), the resin layer is bonded to the substrate to cover the recess, and a heating temperature for drying the resin layer is less than a softening point of a resin of the resin layer.

5. The method for manufacturing a substrate according to claim 1, wherein the end portion of the support is positioned beyond 5 mm outside of an end portion of the substrate, and in (3), the solvent is introduced from the substrate side.

6. The method for manufacturing a substrate according to claim 1, wherein in (3), the solvent is introduced while rotating the substrate to remove the end portion of the resin layer in no contact.

7. The method for manufacturing a substrate according to claim 6, wherein the end portion of the support is positioned within 5 mm outside of an end portion of the substrate, and in (3), a rotation speed of the substrate is controlled to a range of 500 to 2000 rpm.

8. The method for manufacturing a substrate according to claim 1, wherein in (3), the solvent is introduced while rotating the substrate to remove the end portion of the resin layer in no contact.

9. A method for manufacturing a liquid ejection head substrate comprising a substrate, an energy generating element formed on a first surface of the substrate for ejecting a liquid, a liquid flow path for disposing the liquid on the energy generating element, an ejection orifice communicating with the liquid flow path for ejecting the liquid, a liquid supply port with an opening in the first surface of the substrate for supplying the liquid to the liquid flow path, and a common liquid chamber with an opening in a second surface opposite to the first surface of the substrate and communicating with the liquid supply port, wherein at least a part of members to form the ejection orifice or a wall of the liquid flow path comprises a resin layer formed by the method comprising:

(1) providing the resin layer formed on a support, the support being larger than an outer size of the substrate;
(2) bonding the resin layer formed on the support to the substrate;
(3) removing an end portion of the resin layer disposed on an end portion of the support and in no contact with the substrate by a solvent capable of dissolving the resin layer;
(4) peeling off the support from the resin layer; and
(5) drying the resin infiltrated with the solvent between (3) and (4).

* * * * *